(No Model.)

J. H. CROSBY.
RAIL JOINT.

No. 504,711.  Patented Sept. 12, 1893.

Witnesses
John Smurie
R. W. Bishop

Inventor
Joseph H. Crosby
by his Attorneys
Chas. E. Fairman & Co.

UNITED STATES PATENT OFFICE.

JOSEPH H. CROSBY, OF ST. ALBANS, VERMONT.

RAIL-JOINT.

SPECIFICATION forming part of Letters Patent No. 504,711, dated September 12, 1893.

Application filed May 1, 1893. Serial No. 472,502. (No model.)

*To all whom it may concern:*

Be it known that I, JOSEPH H. CROSBY, a citizen of the United States, residing at St. Albans, in the county of Franklin and State of Vermont, have invented certain new and useful Improvements in Rail-Joints; and I do hereby declare the following to be a full, clear, and exact description of the invention, such as will enable others skilled in the art to which it appertains to make and use the same.

My invention relates to improvements in rail joints and consists in certain novel features which will be hereinafter described and claimed.

Figure 1:
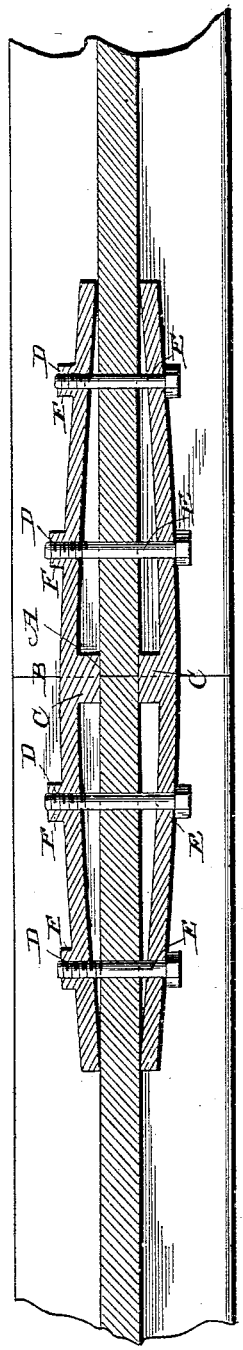
Figure 2:
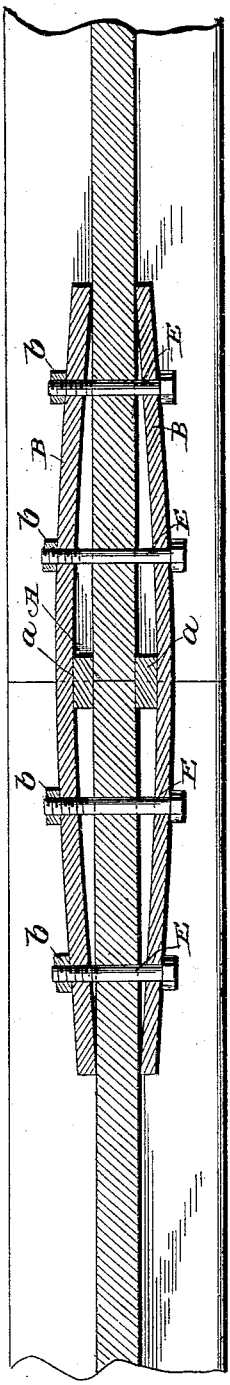

In the accompanying drawings, Figure 1 is a horizontal longitudinal section of my improved rail joint, and Fig. 2 is a similar view showing a modification.

In these drawings, A A designate the meeting ends of two adjacent rails. Alongside these rails, I arrange the fish plates B B which are provided on their inner faces with the central enlargements, bosses or fulcrums C which bear against the webs of the rails at the ends or junction of the same, as clearly shown. The openings D in one of the fish plates are internally threaded and the fastening bolts E are inserted through the other fish plate and the webs of the rails and engage these threaded openings. In order to give a more extended bearing to the bolts and consequently increase the strength of the fastening, I provide the bosses F around these threaded openings which are engaged by the ends of the bolts as clearly shown.

It will be obvious from the foregoing description that I have provided a rail joint which is composed of very few parts and which will be exceedingly strong. The joint is very easily arranged. The fish plates are arranged along the ends of the rails, as shown in the drawings, and the bolts are then inserted through them and turned home. The central fulcrum blocks hold the central portions of the fish plates out so that the ends of the same are away from the rails. Of course, as the bolts are turned home, the ends of the fish plates are drawn toward the rails and thereby forced to act like springs and exert a powerful tension on the bolts. Consequently when the ends of the fish plates are drawn against the rails, the said rails will be most securely held in their proper alignment.

In Fig. 2 I have shown an arrangement by which my invention may be adapted to utilize the old fish plates now in use. In this arrangement, the fulcrum blocks are provided by scraps of old boiler plate $a$ and the openings in the fish plate are tapped to engage the ends of the bolts while nuts $b$ are arranged against the outer sides of the fish plates to furnish the increased bearing which is desirable to prevent the tearing out of the bolt.

Having thus described my invention, what I claim, and desire to secure by Letters Patent, is—

In a rail joint, the combination with the rails, of the fish plates provided at their centers with fulcrum blocks arranged between themselves and the rails, and bearing against the rails to hold the central portions of the fish plates away from the same, and the fastening bolts inserted through the rails and one fish plate and having their threaded ends engaging threaded openings in the other fish plate whereby the ends of the fish plates will act as spring levers to tighten the bolts.

In testimony whereof I affix my signature in presence of two witnesses.

JOSEPH H. CROSBY.

Witnesses:
 WILBUR P. DAVIS,
 B. D. HOPKINS.